(12) United States Patent
Huang

(10) Patent No.: US 8,337,065 B2
(45) Date of Patent: Dec. 25, 2012

(54) FLEXIBLE LIGHT-GUIDING MODULE WITH WATERPROOF FUNCTION

(75) Inventor: Yao-Lun Huang, Jhonghe (TW)

(73) Assignees: Silitek Electronic (Guangzhou) Co., Ltd., Guangzhou (CN); Lite-On Technology Corporation, Taipei (TW)

( * ) Notice: Subject to any disclaimer, the term of this patent is extended or adjusted under 35 U.S.C. 154(b) by 445 days.

(21) Appl. No.: 12/652,126

(22) Filed: Jan. 5, 2010

(65) Prior Publication Data

US 2010/0309684 A1 Dec. 9, 2010

(30) Foreign Application Priority Data

Jun. 5, 2009 (CN) .......................... 2009 1 0145751

(51) Int. Cl.
*F21V 7/04* (2006.01)
*F21V 23/00* (2006.01)
*F21V 29/00* (2006.01)

(52) U.S. Cl. ........ 362/612; 362/619; 362/628; 362/631; 362/294; 362/373

(58) Field of Classification Search .......... 362/612–613, 362/615, 623–628, 631, 632, 294, 373, 249.02, 362/249.04, 249.06, 249.08; 349/58, 60–63, 349/65; 345/102, 176
See application file for complete search history.

(56) References Cited

U.S. PATENT DOCUMENTS

| 6,247,826 | B1 * | 6/2001 | Funamoto et al. ............ 362/603 |
| 7,188,989 | B2 * | 3/2007 | Miyashita ..................... 362/621 |
| 2009/0059618 | A1 * | 3/2009 | Onikiri et al. ................. 362/603 |
| 2009/0091681 | A1 * | 4/2009 | Nishizawa et al. ............. 349/58 |

* cited by examiner

*Primary Examiner* — Thomas Sember
(74) *Attorney, Agent, or Firm* — Li & Cai Intellectual Property (USA) Office

(57) ABSTRACT

A flexible light-guiding module with waterproof function includes a flexible light-guiding film, a light-reflecting element and a light-generating element. The light-reflecting element is disposed on a bottom side of the flexible light-guiding film. The light-generating element is embedded into the flexible light-guiding film, and the light-generating element has a circuit substrate and at least one light-generating chip electrically disposed on the circuit substrate. Hence, the light-generating element is embedded into the flexible light-guiding film, so that the light-generating element is waterproof. In addition, the present invention can be attached to any plane or curved surface by using the flexible light-guiding film, so that the application field of the present invention is very extensive. Moreover, the flexible light-guiding film and the light-reflecting element are integrally formed in order to decrease manufacturing cost of the present invention.

18 Claims, 5 Drawing Sheets

FLEXIBLE LIGHT-GUIDING MODULE WITH WATERPROOF FUNCTION

BACKGROUND OF THE INVENTION

1. Field of the Invention

The present invention relates to a flexible light-guiding module, in particular, to a flexible light-guiding module with waterproof function.

2. Description of Related Art

Portable electronic device such as mobile phones and personal digital assistants (PDA) are popular information appliances. In those portable electronic devices, keys are often used as a user input interface for inputting data and selecting function of the electronic devices.

The key in the conventional electronic device generally comprises a backlight to provide illumination for a user in a dark environment. Therefore, the user can correctly identify the key. The conventional backlight includes a transparent light guide and a light emitting diode (LED) in the electronic device. Light emitted from the LED is guided by the light guide to distribute over bottom of each key. Therefore, symbols or alphabet can be clearly displayed on the key.

The LED in backlight application is generally of mono color, therefore, symbols or alphabet formed on top of the key are printed with different color to provide colorful display effect. Alternatively, a multiple-color LED is used for a key when a specific color effect is demanded for the key. The manufacture time and cost for above two approaches are burden for the manufacturer.

As the progress of technology, the electronic device is also provided with more function for user. For example, mobile phone can be used for photo, game and video playback. However, the backlight in the mobile phone illuminates symbols and alphabet on all keys. Therefore, user cannot identify the key for game control, photo shooting or video playing and the user is liable to have wrong operation. Moreover, the mobile phone may be rotated during game control, photo shooting or video playing operation. The symbols and alphabet on the keys have different orientation and the user cannot identify the key for game control, photo shooting or video playing, especially when the symbols and alphabet on the keys are transparent.

SUMMARY OF THE INVENTION

In view of the aforementioned issues, the present invention provides a flexible light-guiding module with waterproof function. The present invention provides a light-generating element embedded into a flexible light-guiding film in order to achieve waterproof function.

To achieve the above-mentioned objectives, the present invention provides a flexible light-guiding module with waterproof function, including: a flexible light-guiding film, a light-reflecting element and a light-generating element. The light-reflecting element is disposed on a bottom side of the flexible light-guiding film. The light-generating element is embedded into the flexible light-guiding film, and the light-generating element has a circuit substrate and at least one light-generating chip electrically disposed on the circuit substrate.

To achieve the above-mentioned objectives, the present invention provides a flexible light-guiding module with waterproof function installed under a keyboard module to form a backlight module for the keyboard module. The flexible light-guiding module includes a flexible light-guiding film, a light-reflecting element and a light-generating element. The flexible light-guiding film is disposed under the keyboard module. The light-reflecting element is disposed on a bottom side of the flexible light-guiding film. The light-generating element is embedded into the flexible light-guiding film, wherein the light-generating element has a circuit substrate and at least one light-generating chip electrically disposed on the circuit substrate.

Therefore, the present invention has the following advantages:

1. The light-generating element is embedded into the flexible light-guiding film, so that the light-generating element is waterproof.

2. The present invention can be attached to any plane or curved surface by using the flexible light-guiding film.

3. The flexible light-guiding film and the light-reflecting element are integrally formed in order to decrease manufacturing cost of the present invention.

4. The application field of the present invention is very extensive. For example: mouse, backlight module for keyboard, multimedia remote control, mobile phone, automobile (inner lamp for facial panel, external brake light, direction indicator light etc.), night raincoat, indicator light on vest, solar street lamp for courtyard, footway light, indoor lamp, signboard etc.

In order to further understand the techniques, means and effects the present invention takes for achieving the prescribed objectives, the following detailed descriptions and appended drawings are hereby referred, such that, through which, the purposes, features and aspects of the present invention can be thoroughly and concretely appreciated; however, the appended drawings are provided solely for reference and illustration, without any intention that they be used for limiting the present invention.

DETAILED DESCRIPTION OF THE PREFERRED EMBODIMENTS

Figure 1:
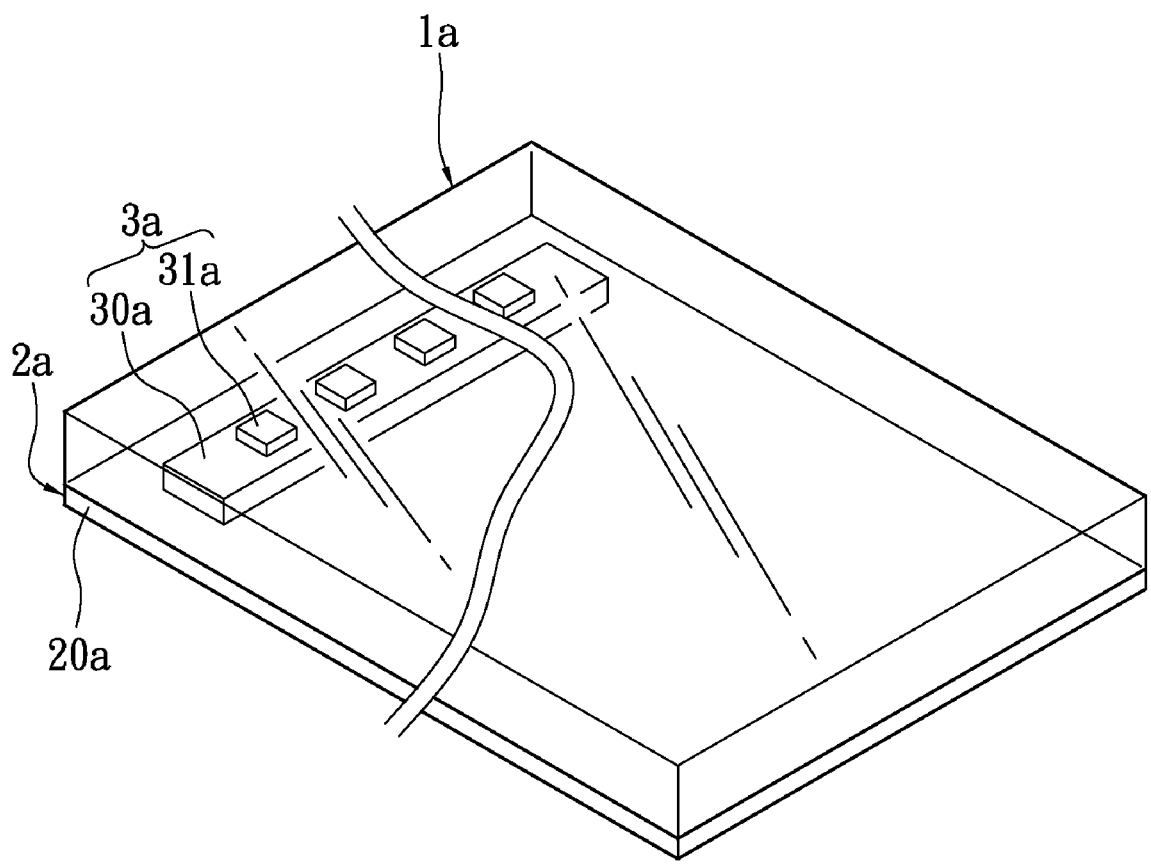
FIG. 1 is perspective, schematic view of the flexible light-guiding module according to the first embodiment of the present invention.

Referring to FIG. 1, the first embodiment of the present invention provides a flexible light-guiding module with waterproof function, including: a flexible light-guiding film 1a, a light-reflecting element 2a and a light-generating element 3a.

The flexible light-guiding film 1a can be a panel flexible translucent plastic, such as polycarbonate, acrylic resin or silica gel etc. The thickness of the flexible light-guiding film 1a is between 0.05 mm and 5 mm, and the best thickness is between 0.07~0.15 mm. However, the above-mentioned material and the thickness of the flexible light-guiding film 1a are preferred examples and do not limit the present invention.

Moreover, the light-reflecting element 2a is disposed on a bottom side of the flexible light-guiding film 1a. For example, the light-reflecting element 2a can be a light-reflecting film 20a disposed on the bottom side of the flexible light-guiding film 1a in the first embodiment.

In addition, the light-generating element 3a is embedded into one side of the flexible light-guiding film 1a, and the light-generating element 3a has a circuit substrate 30a and a plurality of light-generating chips 31a electrically disposed on the circuit substrate 30a. For example, the circuit substrate 30a can be a PCB (Printed circuit board) or an FPC (Flexible Printed circuit), and each light-generating chip 31a can be an LED (Light emitting diode) chip.

Hence, light beams (not shown) generated from the light-generating chips 31a can generate upward surface light by the guiding of the flexible light-guiding film 1a and the reflecting of the light-reflecting film 20a of the light-reflecting element 2a.

Figure 2A:
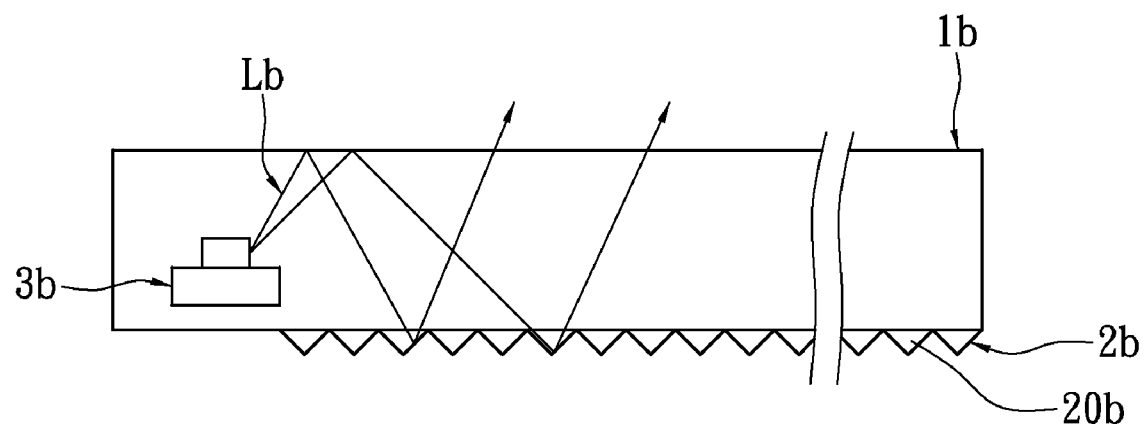
FIG. 2A is lateral, schematic view of the flexible light-guiding module according to the second embodiment of the present invention.

Referring to FIG. 2A, the second embodiment of the present invention provides a flexible light-guiding module with waterproof function, including: a flexible light-guiding film 1b, a light-reflecting element 2b and a light-generating element 3b. The difference between the second embodiment and the first embodiment is that: in the second embodiment, the light-reflecting element 2b is composed of a plurality of micro light-reflecting structures 20b projected outwards from the bottom side of the flexible light-guiding film 1b. In addition, the micro light-reflecting structures 20b can be formed on the bottom side of the flexible light-guiding film 1b by any forming method such as printing or spraying etc according to different design requirements. Furthermore, the micro light-reflecting structures 20b can be integrally formed on the bottom side of the flexible light-guiding film 1b by injection molding or compression molding etc.

Hence, light beams Lb generated from the light-generating chips 31b can generate upward surface light by the guiding of the flexible light-guiding film 1b and the reflecting of the micro light-reflecting structures 20b of the light-reflecting element 2b.

Figure 2B:
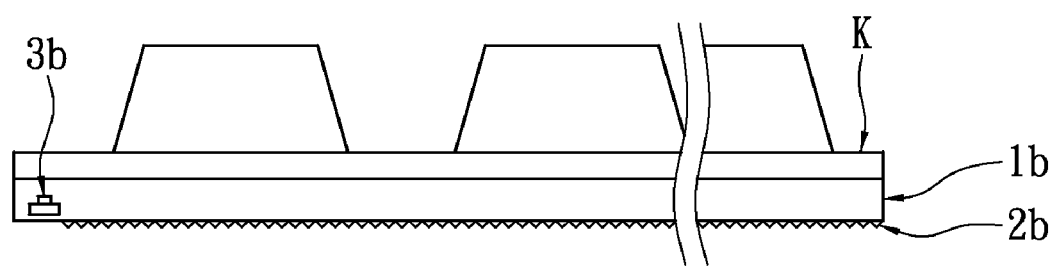
FIG. 2B is lateral, schematic view of the flexible light-guiding module applied to the keyboard module according to the second embodiment of the present invention.

Referring to FIG. 2B, the second embodiment of the present invention can be applied to a keyboard module K. For example, the flexible light-guiding module is installed under the keyboard module K to form a backlight module for the keyboard module K, so that the flexible light-guiding film 1b is disposed under the keyboard module K.

Figure 3:
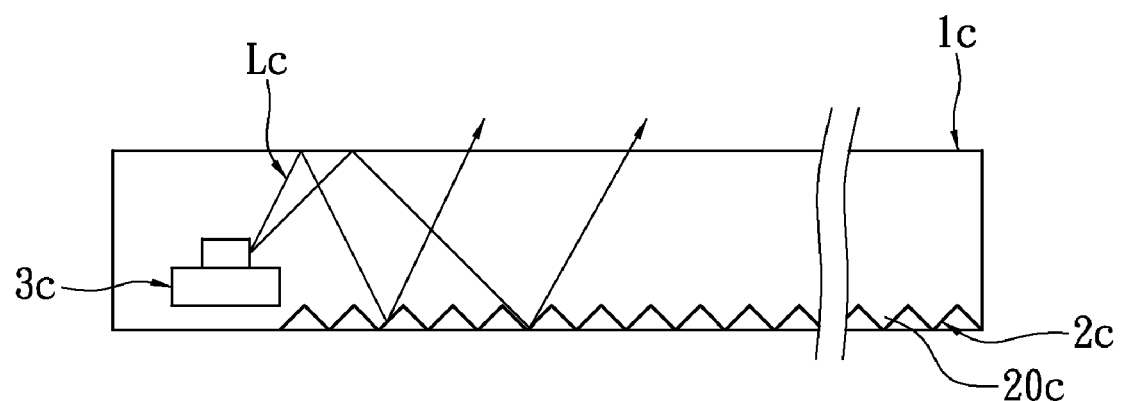
FIG. 3 is lateral, schematic view of the flexible light-guiding module according to the third embodiment of the present invention.

Referring to FIG. 3, the third embodiment of the present invention provides a flexible light-guiding module with waterproof function, including: a flexible light-guiding film 1c, a light-reflecting element 2c and a light-generating element 3c. The difference between the third embodiment and the above-mentioned embodiments is that: in the third embodiment, the light-reflecting element 2c is composed of a plurality of micro light-reflecting structures 20c can be integrally formed on the bottom side of the flexible light-guiding film 1c and concaved inwards.

Of course, the convex micro light-reflecting structures 20b of the second embodiment and the concave micro light-reflecting structures 20c of the third embodiment can be formed on the bottom side of the flexible light-guiding film according to different design requirements. In other words, the light-reflecting element can be composed of a plurality of convex and concave micro light-reflecting structures that are selectively formed on the bottom side of the flexible light-guiding film.

However, the above-mentioned definition for the light-reflecting elements (such as the light-reflecting film and the micro light-reflecting structures) are just an example and does not limit the present invention. Any light-reflective element with an reflection effect can be applied to the present invention.

Hence, light beams Lc generated from the light-generating chips 31c can generate upward surface light by the guiding of the flexible light-guiding film 1c and the reflecting of the micro light-reflecting structures 20c of the light-reflecting element 2c.

Figure 4:
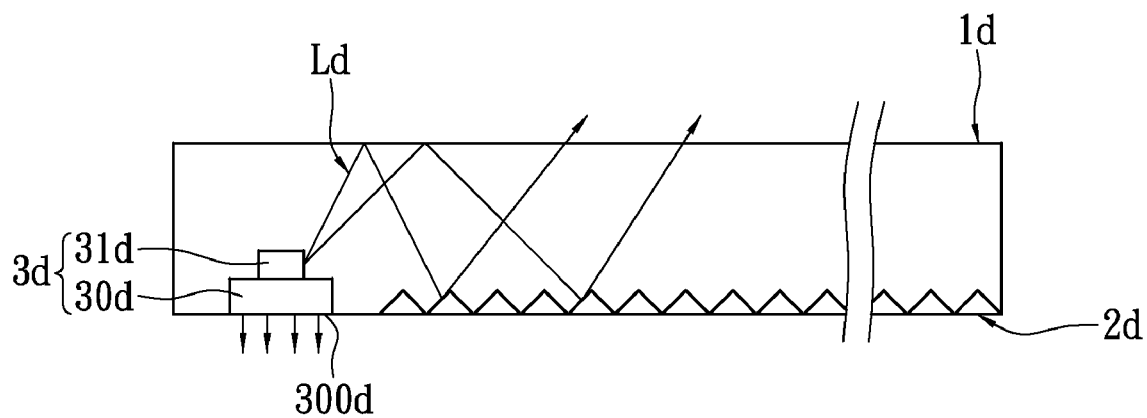
FIG. 4 is lateral, schematic view of the flexible light-guiding module according to the fourth embodiment of the present invention.

Referring to FIG. 4, the fourth embodiment of the present invention provides a flexible light-guiding module with waterproof function, including: a flexible light-guiding film 1d, a light-reflecting element 2d and a light-generating element 3d. The difference between the fourth embodiment and the above-mentioned embodiments is that: in the fourth embodiment, the circuit substrate 30d of the light-generating element 3d has a bottom 300d coplanar or flush with a bottom portion of the flexible light-guiding film 1d, so that the bottom 300d is communicated with the external. In other words, the bottom 300d of the circuit substrate 30d is arranged at the bottom side of the flexible light-guiding film 1d and exposed outside for heat dissipation. Hence, heat generated by the light-generating chips 31d of the light-generating element 3d can be conducted to the external through the circuit substrate 30d (shown as the downward arrows in FIG. 4) in order to increase the heat-dissipating efficiency of the light-generating chips 31d.

Figure 5:
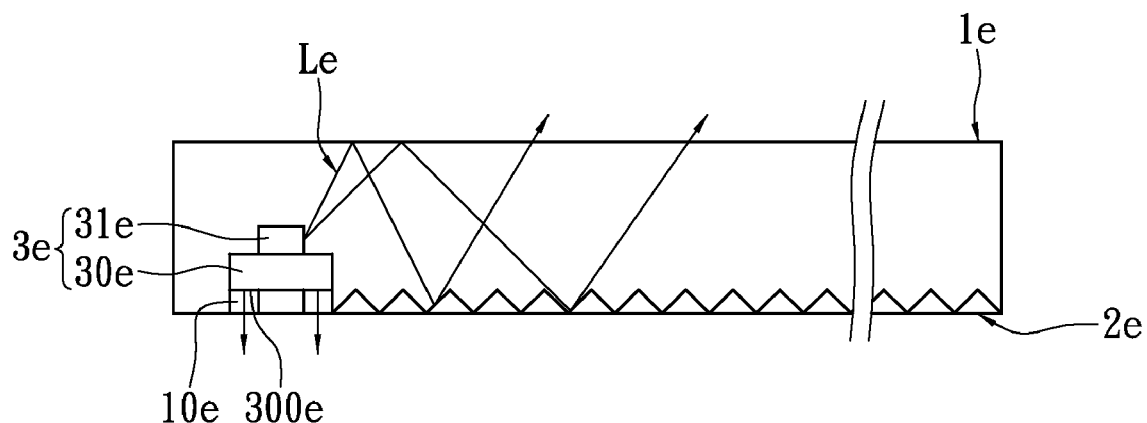
FIG. 5 is lateral, schematic view of the flexible light-guiding module according to the fifth embodiment of the present invention.

Referring to FIG. 5, the fifth embodiment of the present invention provides a flexible light-guiding module with waterproof function, including: a flexible light-guiding film 1e, a light-reflecting element 2e and a light-generating element 3e. The difference between the fifth embodiment and the fourth embodiment is that: in the fifth embodiment, the flexible light-guiding film 1e has at least two heat-dissipating holes 10e formed under the light-generating element 3e, so that a portion of a bottom 300e of the circuit substrate 30e is communicated with the external through the at least two heat-dissipating holes 10e. Hence, heat generated by the light-generating chips 31e of the light-generating element 3e can be conducted to the external through the circuit substrate 30e and the at least two heat-dissipating holes 10e in sequence (shown as the downward arrows in FIG. 5) in order to increase the heat-dissipating efficiency of the light-generating chips 31e.

Figure 6:
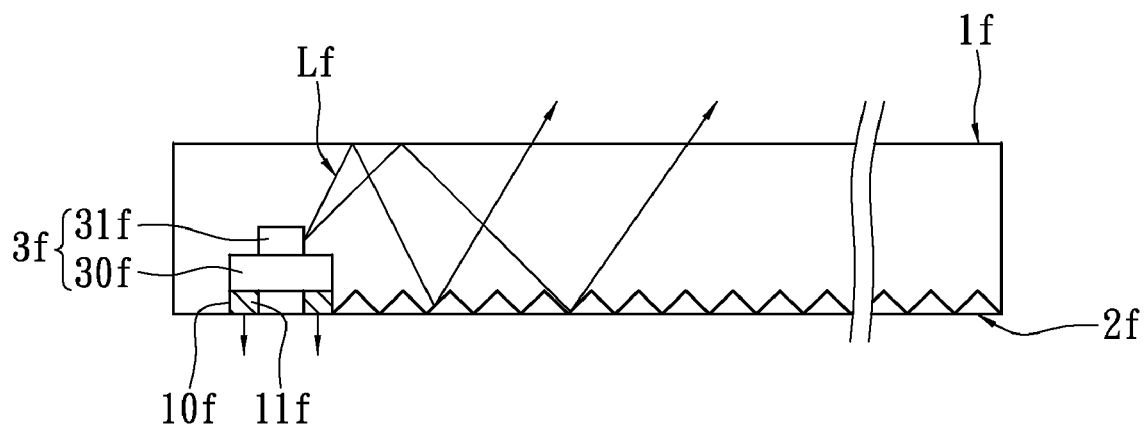
FIG. 6 is lateral, schematic view of the flexible light-guiding module according to the sixth embodiment of the present invention.

Referring to FIG. 6, the sixth embodiment of the present invention provides a flexible light-guiding module with waterproof function, including: a flexible light-guiding film 1f, a light-reflecting element 2f and a light-generating element 3f. The difference between the sixth embodiment and the fifth embodiment is that: in the sixth embodiment, the flexible light-guiding film 1f has at least two heat-dissipating holes 10f formed under the light-generating element 3f and at least two heat-dissipating bodies 11f (such as heat conduction metal substances) respectively filled or disposed in the at least two heat-dissipating holes 10f. In addition, the at least two heat-dissipating holes 10f are formed by a stripping process. In other words, when the light-generating element 3f is supported by the two mold core pins, the light-generating element 3f and one part of the two mold core pins are covered with the flexible light-guiding film 1f by injection molding. Hence, when the two mold core pins are stripped from the flexible light-guiding film 1f, the two heat-dissipating holes 10f are formed in the flexible light-guiding film 1f.

Hence, heat generated by the light-generating chips 31f of the light-generating element 3f can be conducted to the external through the circuit substrate 30f and the at least two heat-dissipating bodies 11f in sequence (shown as the downward arrows in FIG. 6) in order to increase the heat-dissipating efficiency of the light-generating chips 31f.

Figure 7:
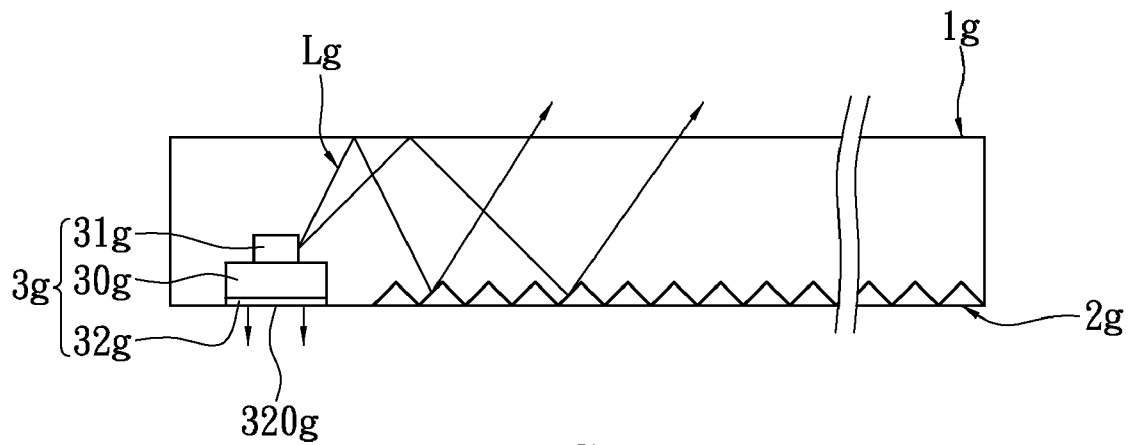
FIG. 7 is lateral, schematic view of the flexible light-guiding module according to the seventh embodiment of the present invention.

Referring to FIG. 7, the seventh embodiment of the present invention provides a flexible light-guiding module with waterproof function, including: a flexible light-guiding film 1g, a light-reflecting element 2g and a light-generating element 3g. The difference between the seventh embodiment and the fourth embodiment is that: in the seventh embodiment, the light-generating element 3g has a heat-dissipating element 32g disposed on the bottom 320g of the circuit substrate 30g, so that the bottom 320g of the heat-dissipating element 32g is coplanar or flush with a bottom portion of the flexible light-guiding film 1g (that is, the bottom 320g of the heat-dissipating element 32g contacts with the external). In other words, the bottom 320g of heat-dissipating element 32g is arranged at the bottom side of the flexible light-guiding film 1g and exposed outside for heat dissipation. Hence, heat generated by the light-generating chips 31g of the light-generating element 3g can be conducted to the external through the circuit substrate 30g and the heat-dissipating element 32g in sequence (shown as the downward arrows in FIG. 7) in order to increase the heat-dissipating efficiency of the light-generating chips 31g.

Figure 8:
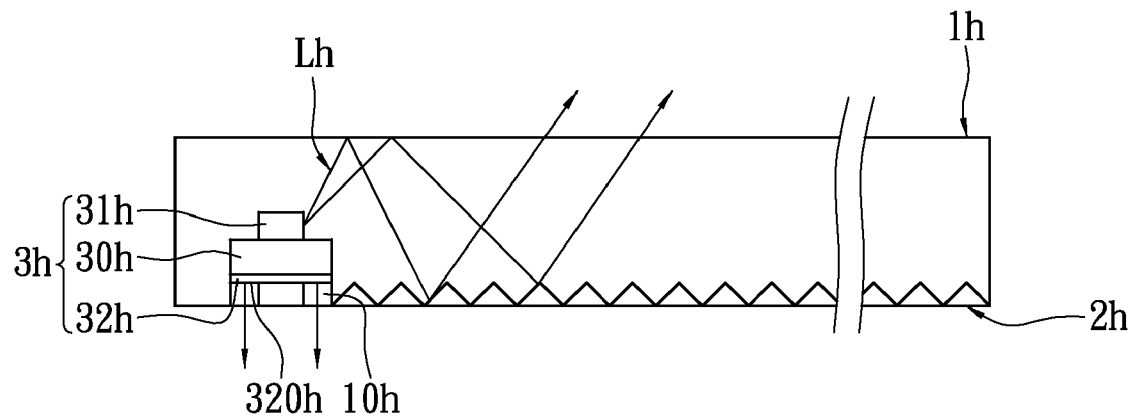
FIG. 8 is lateral, schematic view of the flexible light-guiding module according to the eighth embodiment of the present invention.

Referring to FIG. 8, the eighth embodiment of the present invention provides a flexible light-guiding module with waterproof function, including: a flexible light-guiding film 1h, a light-reflecting element 2h and a light-generating element 3h. The difference between the eighth embodiment and the seventh embodiment is that: in the eighth embodiment, the flexible light-guiding film 1h has at least two heat-dissipating holes 10h formed under the light-generating element 3h, so that a portion of the bottom 320h of the heat-dissipating element 32h is communicated with the external through the at least two heat-dissipating holes 10h. Hence, heat generated by the light-generating chips 31h of the light-generating element 3h can be conducted to the external through the circuit substrate 30h, the heat-dissipating element 32h and the two heat-dissipating holes 10h in sequence (shown as the downward arrows in FIG. 8) in order to increase the heat-dissipating efficiency of the light-generating chips 31h.

Figure 9:
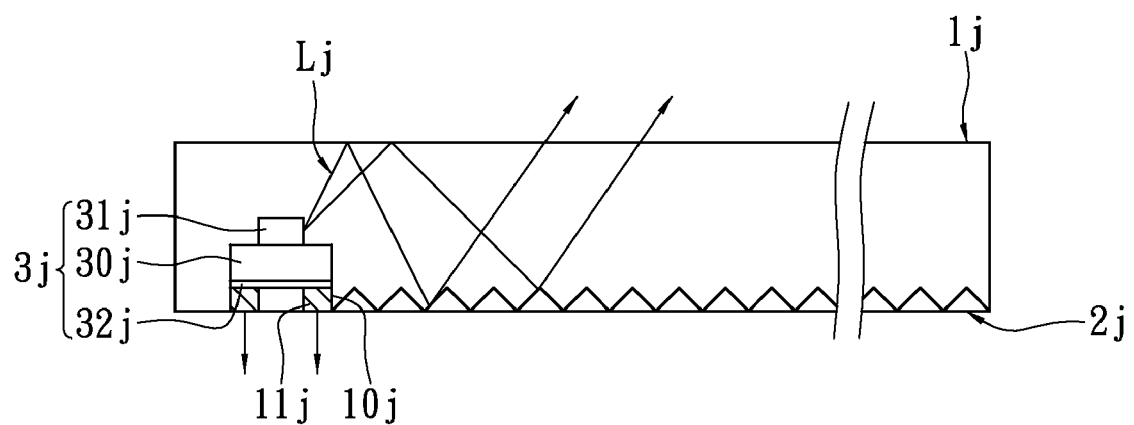
FIG. 9 is lateral, schematic view of the flexible light-guiding module according to the ninth embodiment of the present invention.

Referring to FIG. 9, the ninth embodiment of the present invention provides a flexible light-guiding module with waterproof function, including: a flexible light-guiding film 1j, a light-reflecting element 2j and a light-generating element 3j. The difference between the ninth embodiment and the eighth embodiment is that: in the ninth embodiment, the flexible light-guiding film 1j has at least two heat-dissipating holes 10j formed under the light-generating element 3j and at least two heat-dissipating bodies 11j respectively filled or disposed in the at least two heat-dissipating holes 10j. Hence, heat generated by the light-generating chips 31j of the light-generating element 3j can be conducted to the external through the circuit substrate 30j, the heat-dissipating element 32j and the two heat-dissipating bodies 11j in sequence (shown as the downward arrows in FIG. 9) in order to increase the heat-dissipating efficiency of the light-generating chips 31j.

Figure 10:
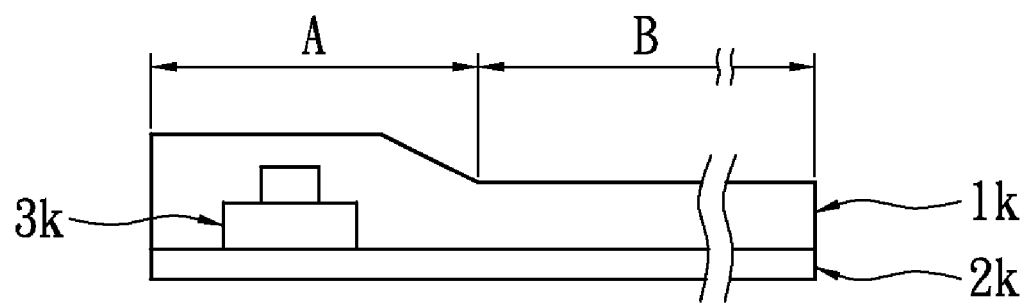
FIG. 10 is lateral, schematic view of the flexible light-guiding module according to the tenth embodiment of the present invention.

Referring to FIG. 10, the tenth embodiment of the present invention provides a flexible light-guiding module with waterproof function, including: a flexible light-guiding film 1k, a light-reflecting element 2k and a light-generating element 3k. The difference between the tenth embodiment and the above-mentioned embodiments is that: in the tenth embodiment, when the whole thickness of the light-generating element 3k is larger than that of the flexible light-guiding film 1k, the flexible light-guiding film 1k can be divided into a first section A for accommodating the light-generating element 3K and a second section B connected to the first section A, and the thickness of the first section A is larger than the thickness of the second section B. Hence, when the whole thickness of the flexible light-guiding film 1k is required to be very thin, the light-generating element 3K of larger size still can be embedded into the flexible light-guiding film 1k.

Figure 11:
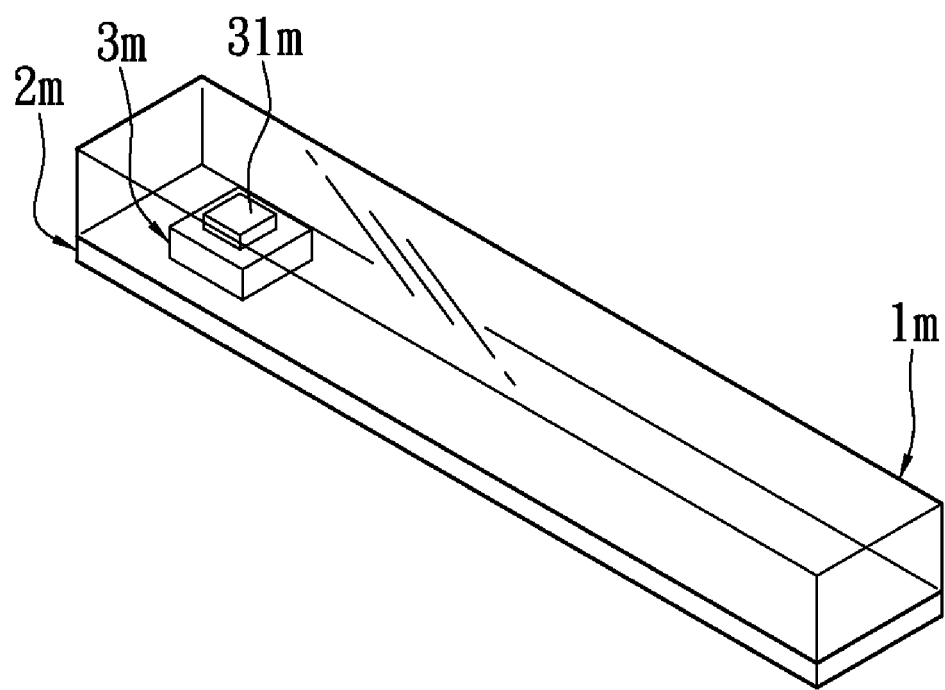
FIG. 11 is lateral, schematic view of the flexible light-guiding module according to the eleventh embodiment of the present invention.

Referring to FIG. 11, the eleventh embodiment of the present invention provides a flexible light-guiding module with waterproof function, including: a flexible light-guiding film 1m, a light-reflecting element 2m and a light-generating element 3m. The difference between the eleventh embodiment and the first embodiment is that: in the eleventh embodiment, the light-generating element 3m has only one light-generating chip 31m, and the flexible light-guiding film 1m has a striped shape. Hence, the present invention not only can generate upward surface light through the flexible light-guiding film 1a as shown in FIG. 1, but also can generate upward striped light through the flexible light-guiding film 1m as shown in FIG. 11.

In conclusion, the light-generating element is embedded into the flexible light-guiding film, so that the light-generating element is waterproof. In addition, the flexible light-guiding film of the present invention can be attached to any plane or curved surface, so that the present invention can be extensively applied in many fields. Moreover, the flexible light-guiding film and the light-reflecting element are integrally formed in order to decrease manufacturing cost of the present invention.

The above-mentioned descriptions merely represent solely the preferred embodiments of the present invention, without any intention or ability to limit the scope of the present invention which is fully described only within the following claims. Various equivalent changes, alterations or modifications based on the claims of present invention are all, consequently, viewed as being embraced by the scope of the present invention.

What is claimed is:

1. A flexible light-guiding module with waterproof function, comprising:
   a flexible light-guiding film;
   a light-reflecting element disposed on a bottom side of the flexible light-guiding film; and
   a light-generating element embedded into the flexible light-guiding film, wherein the light-generating element has a circuit substrate and at least one light-generating chip electrically disposed on the circuit substrate;

wherein the flexible light-guiding film is divided into a first section for receiving the light-generating element and a second section connected to the first section, and the thickness of the first section is larger than the thickness of the second section.

2. The flexible light-guiding module according to claim 1, wherein the flexible light-guiding film is polycarbonate, acrylic resin or silica gel, and the thickness of the flexible light-guiding film is between 0.05 mm and 5 mm.

3. The flexible light-guiding module according to claim 1, wherein the light-reflecting element has a plurality of micro light-reflecting structures integrally formed on the bottom side of the flexible light-guiding film and projected outwards.

4. The flexible light-guiding module according to claim 1, wherein the light-reflecting element has a plurality of micro light-reflecting structures integrally formed on the bottom side of the flexible light-guiding film and concaved inwards.

5. The flexible light-guiding module according to claim 1, wherein the circuit substrate is a PCB or an FPC, and the at least one light-generating chip is an LED.

6. The flexible light-guiding module according to claim 1, wherein a bottom of the circuit substrate is disposedly arranged at the bottom side of the flexible light-guiding film for heat dissipation.

7. The flexible light-guiding module according to claim 1, wherein the flexible light-guiding film has at least one heat-dissipating hole formed under the light-generating element by a stripping process, so that a portion of a bottom of the circuit substrate is communicated with an external through the at least one heat-dissipating hole.

8. The flexible light-guiding module according to claim 1, wherein the flexible light-guiding film has at least one heat-dissipating hole formed under the light-generating element by a stripping process and at least one heat-dissipating body filled or disposed in the at least one heat-dissipating hole.

9. The flexible light-guiding module according to claim 1, wherein the light-generating element has a heat-dissipating element disposed on a bottom of the circuit substrate, and the heat-dissipating element is disposedly arranged at the bottom side of the flexible light-guiding film.

10. The flexible light-guiding module according to claim 1, wherein the light-generating element has a heat-dissipating element disposed on a bottom of the circuit substrate, and the flexible light-guiding film has at least one heat-dissipating hole formed under the light-generating element by a stripping process, so that a portion of a bottom of the heat-dissipating element is communicated with an external through the at least one heat-dissipating hole.

11. The flexible light-guiding module according to claim 1, wherein the light-generating element has a heat-dissipating element disposed on a bottom of the circuit substrate, the flexible light-guiding film has at least one heat-dissipating hole formed under the light-generating element by a stripping process and at least one heat-dissipating body filled or disposed in the at least one heat-dissipating hole.

12. The flexible light-guiding module according to claim 1, wherein the flexible light-guiding module is a backlight module installed under a keyboard module, and the flexible light-guiding film is disposed under the keyboard module.

13. A flexible light-guiding module with waterproof function, comprising:
a flexible light-guiding film;
a light-reflecting element disposed on a bottom side of the flexible light-guiding film; and
a light-generating element embedded into the flexible light-guiding film, wherein the light-generating element has a circuit substrate and at least one light-generating chip electrically disposed on the circuit substrate;
wherein a bottom of the circuit substrate is exposedly arranged at the bottom side of the flexible light-guiding film for heat dissipation.

14. The flexible light-guiding module according to claim 13, wherein the circuit substrate has a heat-dissipating element exposed from the flexible light-guiding film.

15. A flexible light-guiding module with waterproof function, comprising:
a flexible light-guiding film;
a light-reflecting element disposed on a bottom side of the flexible light-guiding film; and
a light-generating element embedded into the flexible light-guiding film, wherein the light-generating element has a circuit substrate and at least one light-generating chip electrically disposed on the circuit substrate;
wherein the flexible light-guiding film has at least one heat-dissipating hole disposed between a bottom of the circuit substrate and the bottom side of the flexible light-guiding film.

16. The flexible light-guiding module according to claim 15, wherein the circuit substrate has a heat-dissipating element connected to the at least one heat-dissipating hole.

17. The flexible light-guiding module according to claim 15, wherein the flexible light-guiding film has at least one heat-dissipating body disposed in the at least one heat-dissipating hole.

18. The flexible light-guiding module according to claim 17, wherein the circuit substrate has a heat-dissipating element connected to the at least one heat-dissipating body.

* * * * *